United States Patent
Willenbücher et al.

(10) Patent No.: US 12,049,391 B2
(45) Date of Patent: Jul. 30, 2024

(54) FORESTRY WINCH

(71) Applicant: Bernward Welschof, Grossostheim (DE)

(72) Inventors: Michael Willenbücher, Oberzent (DE);
Claus Hofmann, Haibach (DE);
Bernward Welschof, Grossostheim (DE)

(73) Assignee: Bernward Welschof, Grossostheim (DE)

( * ) Notice: Subject to any disclaimer, the term of this patent is extended or adjusted under 35 U.S.C. 154(b) by 90 days.

(21) Appl. No.: 17/670,568

(22) Filed: Feb. 14, 2022

(65) Prior Publication Data
US 2022/0259018 A1    Aug. 18, 2022

(30) Foreign Application Priority Data

Feb. 15, 2021 (DE) .................. 10 2021 103 443.4
Feb. 22, 2021 (DE) .................. 10 2021 104 131.7

(51) Int. Cl.
*B66D 1/08* (2006.01)
*B66D 1/44* (2006.01)
*B66D 5/26* (2006.01)
*F16D 121/12* (2012.01)

(52) U.S. Cl.
CPC .............. *B66D 1/08* (2013.01); *B66D 1/44* (2013.01); *B66D 5/26* (2013.01); *B66D 2700/035* (2013.01); *F16D 2121/12* (2013.01)

(58) Field of Classification Search
None
See application file for complete search history.

(56) References Cited

U.S. PATENT DOCUMENTS

| | | | | |
|---|---|---|---|---|
| 3,969,897 A | * | 7/1976 | Humphreys | F15B 21/0423 |
| | | | | 60/905 |
| 3,976,333 A | * | 8/1976 | Fillion | B66D 5/26 |
| | | | | 60/905 |
| 5,141,386 A | * | 8/1992 | Barwise | A01G 23/006 |
| | | | | 414/729 |

FOREIGN PATENT DOCUMENTS

| | | |
|---|---|---|
| DE | 102018104801 A1 | 9/2018 |
| DE | 102018104810 A1 | 9/2019 |
| FR | 2547569 A1 | 12/1984 |
| GB | 2101952 A | 1/1983 |

* cited by examiner

*Primary Examiner* — Kenneth Bomberg
*Assistant Examiner* — Michael Quandt
(74) *Attorney, Agent, or Firm* — The Webb Law Firm (57) ABSTRACT

A forestry winch may include a rope drum driven by a drive motor, wherein a rope is wound up on the rope drum, wherein the rope drum is functionally connected with a brake device, wherein the brake device is in the form of a spring-loaded brake which is impinged by a spring device toward a braking position and by a hydraulic brake release pressure present in a brake release pressure line toward a release position, wherein the drive motor is in the form of a hydraulic motor which is connected by a first pressure medium line and a second pressure medium line to a multi-port control valve device controlling the drive motor, and a bypass valve device connecting the first and second pressure medium lines and is located in a connecting line connecting the first and second pressure medium lines and has a closed position and a flow position.

17 Claims, 7 Drawing Sheets

FORESTRY WINCH

CROSS REFERENCE TO RELATED APPLICATIONS

This application claims priority to German Application No. DE 102021103443.4, filed Feb. 15, 2021, and German Application No. 102021104131.7, filed Feb. 22, 2021, the disclosures of which are herein incorporated by reference in their entireties.

BACKGROUND OF THE INVENTION

Field of the Invention

This disclosure relates to a forestry winch which has a rope drum driven by a drive motor, on which drum of rope is wound, and the rope drum is functionally connected with a brake device, whereby the brake device is in the form of a spring-loaded brake which is impinged by a spring device toward a braking position and by a hydraulic brake release pressure present in a brake release pressure line into a release position, whereby the drive motor is a hydraulic motor which is connected by a first pressure medium line and a second pressure medium line to a multi-port control valve device controlling the drive motor.

Description of Related Art

DE 10 2018 104 810 A1 describes a mobile forestry machine with a forestry winch which is in the form of a hydraulic motor and is connected by a first pressure medium line and a second pressure medium line to a multi-port control valve device controlling the drive motor.

The prior art also includes forestry winches equipped with a braking device in the form of a spring-loaded brake with which the rope drum is braked with a defined braking torque.

If a forestry winch with a spring-loaded brake is driven by a hydraulic motor, operating conditions can occur in which the rope drum must be braked by a hydraulic braking torque in addition to the mechanical braking torque of the spring-loaded brake, for example when the multi-port control valve device is in a closed position in which the two pressure medium lines are shut off. If, when the multi-port control valve device is in the closed position, a tensile force is applied to the rope, for example by a falling tree, a braking pressure builds up in the shut-off pressure medium lines that brakes the rope drum. The sum of the braking torque of the spring-loaded brake and the hydraulic braking moment can in this case result in a total braking torque that is so high that a work machine equipped with the forestry winch can no longer absorb the total braking torque and can be damaged or destroyed.

SUMMARY OF THE INVENTION

The object of this disclosure is to make available a forestry winch of the type described above which eliminates the abovementioned disadvantages and makes safer operation possible.

The disclosure accomplishes this object by providing a bypass valve device connecting the pressure medium lines which is located in a connecting line connecting the two pressure medium lines and has a closed position and a flow position, whereby the bypass valve device is actuated toward the closed position by a hydraulic control pressure present in a control line, and the spring-loaded brake and the bypass valve device are controlled jointly by a control valve.

With the bypass valve device in the flow position, a short circuit connection between the two pressure medium lines can be created, which prevents the buildup of a hydraulic braking pressure that brakes the rope drum when the multi-port control valve device is in the closed position in which both pressure medium lines are shut off. With a bypass valve device of this type in the flow position it can therefore be ensured that the rope drum is braked only by the mechanical braking torque of the spring-loaded brake, so that a work machine equipped with the forestry winch can be safely and simply protected against an overload caused by an excessive braking torque on the rope drum. With a control valve that controls the control pressure that actuates the bypass valve device and the brake release pressure that actuates the spring-loaded brake and therefore switches the spring-loaded brake and the bypass valve device jointly, it becomes possible in a simple manner to achieve a high degree of functional and operational safety, because it can thereby be ensured in a simple manner that when the spring-loaded brake is switched into the release position, the bypass valve device is impinged into the closed position and when the spring-loaded brake is switched into the braking position, the bypass valve device is impinged into the flow position.

In one advantageous embodiment of the disclosure, in a first control position of the control valve, the spring-loaded brake is impinged into the braking position and the bypass valve into the flow position, and in a second control position of the control valve, the spring-loaded brake is impinged into the release position and the bypass valve device into the closed position. This makes possible, in a simple manner, a high level of functional and operational safety, because in the first control position of the control valve, the spring-loaded brake is impinged into the braking position and the bypass valve device into the flow position, and in a second control position the spring-loaded brake is impinged into the release position and the bypass valve device into the closed position. Unsafe operating conditions, for example, a bypass valve device in the flow position when the spring-loaded brake is impinged into the release position in which the rope drum can rotate uncontrolled when a force is applied to the rope, are therefore safety prevented.

In one advantageous embodiment of the disclosure, the bypass valve device is actuated toward the closed position by the control pressure present in the control line. This makes possible a high level of functional and operational safety, because in the absence of control pressure and absence of brake release pressure, it is ensured that the spring-loaded brake is impinged by the spring device into the braking position and the bypass valve device is impinged by a spring device, for example, into the flow position, and thus the rope drum is braked only by the mechanical braking torque of the spring-loaded brake.

According to one advantageous embodiment of the disclosure, the bypass valve device is a bypass valve controlled directly by the control valve, whereby the control valve in the first control position connects the brake release pressure line and the control line with a reservoir, and in the second control position connects the brake release pressure line and the control line with a control pressure source. The bypass valve is therefore controlled and actuated directly by the control pressure generated with the control valve. If the control valve in the first control position connects the brake release pressure line and the control line with a reservoir, it is ensured in a simple manner that the spring-loaded brake is impinged into the braking position and the bypass valve device into the flow position. If the control valve in the second control position connects the brake release pressure line and the control line with a control pressure source, it is ensured in a simple manner that the spring-loaded brake is impinged into the release position and the bypass valve device into the closed position.

In an alternative and also advantageous embodiment of the disclosure, the bypass valve device is a bypass valve piloted by the control valve, whereby the control valve actuates a pilot valve which in the first switched position connects the control line with the reservoir, and in the second control position connects the control line with a control pressure source, whereby the control valve in a first control position connects the brake release pressure line and a pilot line that leads to the pilot valve with a reservoir and in a second control position connects the brake release pressure line and the pilot line with a control pressure line. The bypass valve is thereby piloted by the control pressure generated with the control valve, whereby the control pressure generated by the control valve actuates the pilot valve, which controls the bypass valve device. With a piloting of the bypass valve device of this type, a safe actuation of the bypass valve device into the closed position can be achieved, in particular on a bypass valve with a large nominal diameter.

Advantageously, the pilot valve is actuated by a spring towards to the first control position and by the pilot pressure present in the pilot line toward the second control position. When the control valve is in the second control position, therefore the spring-loaded brake is actuated into the release position and the pilot valve is actuated by the pilot pressure present in the pilot line into the second control position, in which, as a result of the connection of the control line of the bypass valve device with the control pressure source, the bypass valve device is actuated into the closed position, as result of which it can be assured in a simple manner that the spring-loaded brake is impinged into the release position and the bypass valve device into the closed position. When the control valve is in the first control position, therefore the spring-loaded brake is actuated into the braking position and the pilot valve is actuated by the relief of the pilot line by the spring into the first control position, in which as a result of the relief of the control line to the reservoir, the bypass valve device is actuated into the flow position, as a result of which it is ensured in a simple manner that the spring-loaded brake is impinged into the braking position and the bypass valve device into the flow position.

According to one development of the disclosure, the control line is connected by means of a shuttle valve with the control pressure source and the first pressure medium line. With the shuttle valve, either the control pressure present in the control line or the high pressure present in the first pressure medium line is selected to actuate the bypass valve device into the closed position. If, in the event of a corresponding actuation of the multi-port control valve device, the drive motor of the rope drum is driven by a high pressure present in the first pressure medium line, by means of the shuttle valve device, the high pressure can be easily selected for the switching of the bypass valve device to safely hold the bypass valve device in the closed position while the drive motor of the rope drum is being driven.

In one advantageous development of the disclosure, a freewheeling valve is located in the control line, and in a first control position opens the control line and in a second control position relieves a section of the control line connected with the bypass valve device to a reservoir. With the freewheeling valve in its second control position, therefore, by relieving the section of the control line connected with the bypass valve to the reservoir, the bypass valve device can be actuated into the flow position by a spring, for example. When the spring-loaded brake is in the release position, therefore by actuation of the freewheeling valve into the second control position, it becomes possible in a simple manner to actuate the bypass valve device into the flow position. This makes possible in a simple manner, when the spring-loaded brake is in the release position, that the rope drum can be rotated by a tensile force applied to the rope. This makes it possible, for example on a work machine equipped with the forestry winch, to fasten the rope to a tree and to unspool the rope from the rope drum with the not actuated multi-port control valve device as the working machine moves.

The freewheeling valve can advantageously be actuated by a spring toward the first control position and toward the second control position by an electrical actuator device, in particular a switching solenoid. This makes possible a high level of safety, because when the electrical actuator device is not switched on, the freewheeling valve is in the first control position opening the control line of the bypass valve, in which position the functions of the bypass valve device and of the spring-loaded brake device are controlled by the control valve.

According to one advantageous embodiment of the disclosure, the control valve can be actuated toward the first control position by a spring and toward the second control position by an electrical actuator device, in particular a switching solenoid. As a result, functional and operational safety is further increased because when the electrical actuator device is not switched on, the control valve is in the first control position, in which the spring-loaded brake is impinged into the braking position and the bypass valve device into the flow position. With an electrical actuator device, the control valve can be actuated into the second control position in a simple manner.

According to one advantageous embodiment of the disclosure, the multi-port control valve device is actuated by hydraulic control pressures, whereby the control valve can be actuated toward the first control position by a spring and toward the second control position by the hydraulic control pressures of the multi-port control valve device. Functional and operational safety is thereby further increased, because in the absence of control pressures of the multi-port control valve device the control valve is in the first control position in which the spring-loaded brake is impinged into the braking position and the bypass valve device into the flow position. The use of the hydraulic control pressures of the multi-port control valve device to actuate the control valve into the second control position makes possible a simple switching of the control valve without an additional electrical actuator device.

According to one advantageous embodiment of the disclosure, with the control valve actuated into the second control position, first the bypass valve device is actuated into the closed position and then the spring-loaded brake is impinged into the release position. It is consequently ensured that in a second control position, first the bypass valve device is actuated into the closed position before the spring-loaded brake is actuated into the release position. As a result, the functional and operational safety is further increased, because unsafe operating conditions, for example, in which the bypass valve device is still in the flow position when the spring-loaded brake has already been actuated into the release position, and in which the rope drum can rotate in an uncontrolled manner when a force is applied to the rope, can be safely and simply prevented.

According to one advantageous embodiment, for this purpose the spring device of the spring-loaded brake and a spring device of the bypass valve device that acts toward the flow position or the spring device of the pilot valve are designed so that when the control valve is actuated into the second control position, first the bypass valve device is actuated into the closed position and then the spring-loaded brake is impinged into the release position. By appropriately selecting the bias of the corresponding spring devices, when the control valve is actuated into the second control position, the sequential actuation of the bypass valve device into the closed position before the actuation of the spring-loaded brake into the release position can be guaranteed in a simple matter.

According to an alternative and likewise advantageous embodiment, located in the brake release pressure line is a spring-biased shutoff valve, in particular a check valve, that opens toward the spring-loaded brake. With a spring-biased shutoff valve of this type in the brake release pressure line of the spring-loaded brake, it can also be guaranteed in a simple manner that when the control valve is actuated into the second control position, the bypass valve device will be actuated into the closed position before the spring-loading brake is actuated into the release position.

It is particularly advantageous if, in a bypass line that bypasses the spring-biased shutoff valve, there is an unbiased shutoff valve, in particular a check valve, that opens toward the control valve. The bypass line makes it possible for the brake release pressure in the brake release pressure line to be rapidly reduced via the open unbiased shutoff valve to the reservoir, so that the spring-biased shutoff valve does not interfere with the dropping of the spring-loaded brake into the braking position.

According to one development of the disclosure, in a line connecting the first pressure medium line with the second pressure medium line, there is a spring-biased shutoff valve, in particular a check valve, that opens toward the first pressure medium line. With a spring-biased shutoff valve of this type that opens from the second to the first pressure medium line, a back pressure can be generated from the second to the first pressure medium line. The spring-biased shutoff valve makes it possible, for example, that when the spring-loaded brake is in the release position, the rope drum can be turned by a tensile force applied to the rope. This makes it possible, for example, on a work machine equipped with the forestry winch, to fasten the rope to a tree and with the multi-port control valve device not actuated when the work machine moves, to unspool the rope from the rope drum.

According to one development of the disclosure, the forestry winch is provided with a pusher roller for the rope, whereby the additional drive motor is in the form of a hydraulic motor which is connected by means of a first connecting line and a second connecting line to a multi-port control valve device that controls the additional drive motor. With a pusher roller driven by an additional drive motor, during the unspooling of the rope from the rope drum, as well as during the spooling of the rope onto the rope drum, a desired rope tension can be applied to the rope, which makes possible a safe and orderly spooling of the rope on the rope drum when the rope is being wound on the drum. With the rope tension applied to the rope by the driven pusher roller, less operating effort is required from an operator who, during the unspooling of the rope from the rope drum, must pull the rope over a significant length of up to 100 m.

In one advantageous configuration of the disclosure, in a connecting line that connects the first pressure medium line with the second pressure medium line, there is an unbiased shutoff valve that opens toward the first pressure medium line, in particular a check valve, whereby in the connecting line there is a valve controlled by the pressure in the first connecting line, which has a closed position and a flow position. With the valve controlled by the pressure in the first connecting line, the back pressure from the second to the first pressure medium line can be switched between a low back pressure of the unbiased shutoff valve and a higher back pressure of the spring-biased shutoff valve. In the event of an increase of the pressure in the first connecting line, it becomes possible to switch to the higher back pressure, so that with a corresponding switching of the multi-port control valve device, the rope drum is driven by the drive motor so that the pusher roller driven by the additional drive motor is assisted during the unspooling of the rope by the rope drum driven in the unspooling direction.

The valve is advantageously actuated by a spring toward the flow position and by the pressure in the first connecting line toward the closed position. If the pressure in the first connecting line increases and thus the drive motor of the pusher roller requires a high pressure during the unspooling of the rope from the rope drum, as a result of the actuation of the shutoff valve into the closed position, the pressure is automatically switched to the higher back pressure of the spring-biased shutoff valve, so that the drive motor of the rope drum is also operated in the unspooling direction of the rope and the pusher roller is assisted during the unspooling of the rope from the rope drum.

The disclosure further relates to a mobile work machine, in particular a remotely controlled mobile work machine without a driver workplace, with a forestry winch according to the invention. Remotely controlled mobile work machines without a driver workplace have a compact and lightweight construction. With a bypass valve device according to the disclosure which ensures that the rope drum is braked only by the mechanical braking torque of the spring-biased brake, a lightweight and compact remotely controlled work machine can be safely and simply protected from an overload caused by an excessive braking torque on the rope drum.

BRIEF DESCRIPTION OF THE DRAWINGS

Additional advantages and details of the disclosure are explained in greater detail below with reference to the exemplary embodiments illustrated in the accompanying schematic figures, in which.

DESCRIPTION OF THE DISCLOSURE

Figure 1:
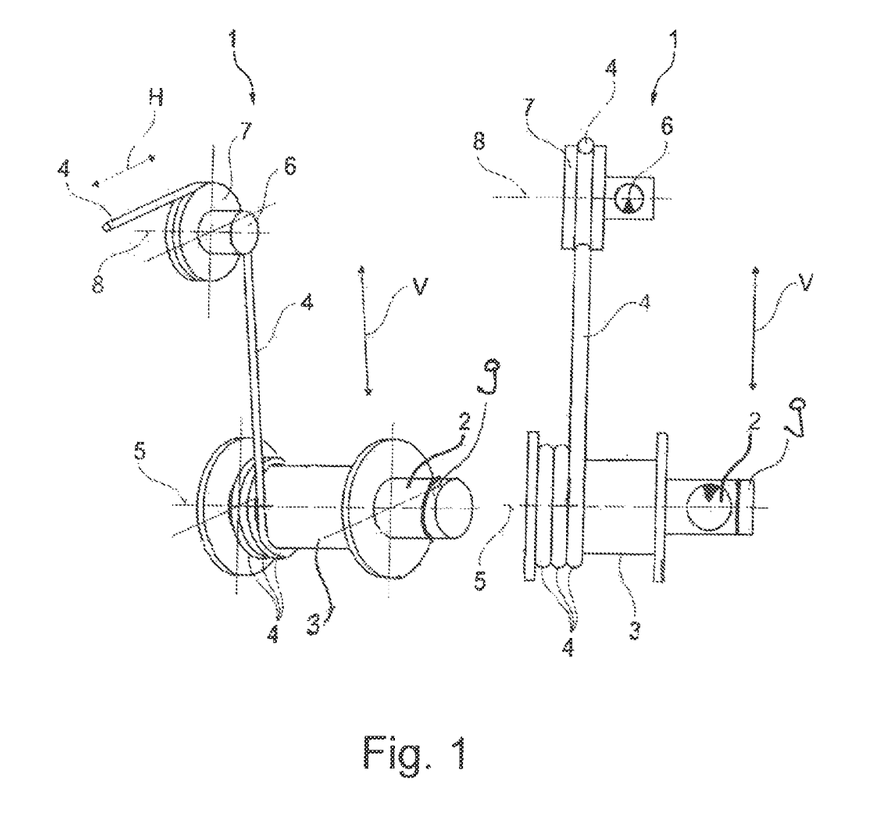
FIG. 1 is a schematic drawing of a forestry winch according to the disclosure.

FIG. 1 is a schematic illustration of a forestry winch 1 according to the disclosure. The left side of the illustration in FIG. 1 is a view in perspective and the right side of the illustration is a head-on view of the forestry winch 1 according to the disclosure.

The forestry winch 1 has a rope drum 3 driven by a drive motor 2, on which a rope 4, such as a steel wire rope, is spooled. The rope drum 3 can rotate around an axis of rotation 5 and is driven by the drive motor 2 which is in the form of a hydraulic motor.

In the illustrated exemplary embodiment, the forestry winch 1 also has a pusher roller 7 for the rope 4 driven by an additional drive motor 6. The pusher roller 7 can rotate around an axis of rotation 8 and is driven by the additional drive motor 6 which is in the form of a hydraulic motor.

In the illustrated exemplary embodiment, the rope 4 is guided in the vertical direction V from the rope drum 3 to the pusher roller 7, guided over the pusher roller 7 and deflected on the pusher roller 7 so that the wire rope 4 is diverted in the horizontal direction H by the pusher roller 7.

The rope 4 is pressed against the pusher roller 7 by means of a presser device which is not illustrated in any further detail for the sake of simplicity. The rope drum 3 and the drive motor 2 remain functionally linked with a brake device 9.

FIGS. 2 to 7 are hydraulic circuit diagrams of the forestry winch 1 according to the disclosure, in which identical components are identified by the same reference number.

Figure 2:
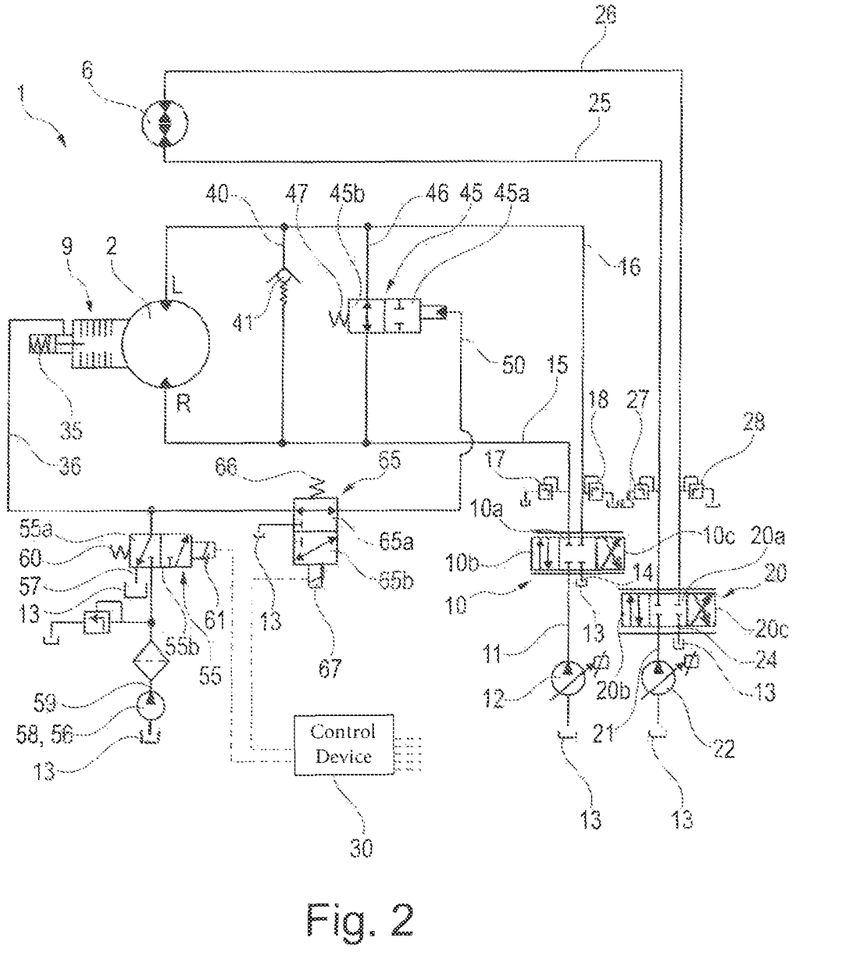
FIG. 2 is a first exemplary embodiment of a hydraulic circuit diagram of a forestry winch according to the disclosure.

In FIG. 2, the drive motor 2, in the form of a hydraulic motor, of the rope drum 3 can be controlled by means of a multi-port control valve device 10. The multi-port control valve device 10 is connected to a delivery line 11 of a hydraulic pump 12, which sucks pressure medium from a reservoir 13, to a tank line 14 that leads to the reservoir 13, and to a first pressure medium line 15 connected to a connection R of the drive motor 2 and to a second pressure medium line 16 connected to a connection L of the drive motor 2. A protective pressure limiting valve 17 is connected to limit a maximum working pressure in the first pressure medium line 15. A corresponding protective pressure limiting valve 18 is connected to ensure a maximum working pressure in the second pressure medium line 16.

The multi-port control valve device 10 has a neutral position 10a, in which the delivery line 11, the tank line 14 and the pressure medium lines 15, 16 are shut off. The multi-port control valve device 10 has a first control position 10b in which the delivery line 11 is connected with the first pressure medium line 15 and the second pressure medium line 16 is connected with the tank line 14. In the first control position 10b, the drive motor 2 is operated in the spooling direction in which the rope 4 is wound up onto the rope drum 3. The multi-port control valve device 10 has a second control position 10c in which the delivery line 11 is connected with the second pressure medium line 16 and the first pressure medium line 15 is connected with the tank line 14. In the second control position 10c, the drive motor 2 is operated in the unspooling direction in which the rope 4 is paid out from the rope drum 3.

The additional drive motor 6, which is in the form of a hydraulic motor, of the pusher roller 7 can be controlled by means of an additional multi-port control valve device 20.

The additional multi-port control valve device 20 is connected to a delivery line 21 of an additional hydraulic pump 22 which sucks pressure medium out of the reservoir 13, to a tank line 24 that leads to the reservoir 13 and to a first connecting line 25 connected with a first connection of the drive motor 6, and to a second connecting line 26 connected with a second connection of the drive motor 6. Connected to the first connecting line 25 is a pressure limiting valve 27 that limits the maximum working pressure in the first connecting line 25. Correspondingly, connected to the second connecting line 26 is a pressure limiting valve 28 that limits the maximum working pressure in the second connecting line 26. Alternatively, only one hydraulic pump 12, 22 can be provided to supply both drive motors 2, 6.

The additional multi-port control valve device 20 has a closed position 20a in which the delivery line 21, the tank line 24 and the connecting lines 25, 26 are shut off. The multi-port control valve device 20 has a first control position 20b in which the delivery line 21 is in communication with the first connecting line 25 and the second connecting line 26 is in communication with the tank line 24. In the first control position 20b, the additional drive motor 6 is operated in the unspooling direction in which the rope 4 is paid out from the rope drum 3. The additional multi-port control valve device 20 has a second control position 20c in which the delivery line 21 is in communication with the second connecting line 26 and the first connecting line 25 is in communication with the tank line 24.

The multi-port control valves 10, 20 can be switched by means of an electronic control device 30 into the control positions 10b, 10c, 20b, 20c.

The brake device 9 which is in functional communication with the rope drum 3 and the drive motor 2 is in the form of a spring-loaded brake device 9 which is impinged by a spring device 35 toward a braking position and by a hydraulic brake release pressure present in a brake release pressure line 36 toward a release position.

A spring-biased shutoff valve 41 opening toward the first pressure medium line 15 can be located in a line 40 that connects the first pressure medium line 15 with the second pressure medium line 16. In the illustrated exemplary embodiment, the spring-biased shutoff valve 41 is in the form of a check valve which is impinged by a spring into a closed position.

According to the disclosure, a bypass valve device 45 connecting the two pressure medium lines 15, 16 is provided which is located in a connecting line 46 connecting the two pressure medium lines 15, 16. In the embodiment illustrated in FIG. 2, the bypass valve device 45 is in the form of a directional control valve that has a closed position 45a and a flow position 45b.

In FIG. 2, the bypass valve device 45 is actuated toward the closed position 45a by a hydraulic control pressure present in a control line 50. The bypass valve device 45 is actuated by a spring device 47 toward the flow through flow position 45b.

The spring-loaded brake device 9 and the bypass valve device 45 are controlled jointly by a control valve 55.

In FIG. 2, the bypass valve device 45 is in the form of a bypass valve controlled directly by the control valve 55. For this purpose, the control valve 55 is a three-port, two-position valve which is connected at a first port to the control line 50 and the brake release pressure line 36, at a second port to a pressure source 56 and at a third port to a tank line 57 that leads to the reservoir 13. In the illustrated exemplary embodiment, the control pressure source 56 is in the form of a feed pump 58 that sucks pressure medium out of the reservoir 13 and transports it into a delivery line 59 connected to the second port of the control valve 55.

The control valve 55 has a first control position 55a in which the brake release pressure line 36 and the control line 50 are connected with the reservoir 13, and a second control position 55b in which the brake release pressure line 36 and the control line 50 are connected with the delivery line 59 of the feed pump 58 and thus with the control pressure source 56. Additionally, in the first control position 55a, the delivery line 59 is shut off. In the second control position 55b the tank line 57 is also shut off.

In the first control position 55a, the control valve 55 therefore relieves the brake release pressure line 36 and the control line 50 to the reservoir 13, so that in the first control position 55a, the spring-loaded brake device 9 is impinged by the spring device 35 into the braking position and the bypass valve device 45 is impinged by the spring device 47 into the flow position 45b. In the second control position 55b, the control valve 55 connects the brake release pressure line 36 and the control line 50 with the delivery line 59 of the feed pump 58, so that in the second control position 55b, the spring-loaded brake device 9 is impinged into the release position by the delivery pressure supplied by the feed pump 58 against the force of the spring device 35, and the bypass valve device 45 is impinged into the closed position 45a by the delivery pressure provided by the feed pump 58 against the force of the spring device 47.

The control valve 55 can be actuated toward the first control position 55a by a spring 60 and toward the second control position 55b by an electrical actuator device 61, such as a switching solenoid, for example. The electrical actuator device 61 is connected with the electronic control device 30 for switching.

In the control line 50, there is a freewheeling valve 65 which opens the control line 50 in a first control position 65a and in a second control position 65b relieves a section of the control line 50 connected with the bypass valve device 45 to the reservoir 13.

The freewheeling valve 65 can be actuated by a spring 66 toward the first control position 65a and by an additional electrical actuator device 67, such as a switching solenoid, for example, toward the second control position 65b. The additional electrical actuator device 67 is connected with the electronic control device 30 for switching.

For the braking of the rope drum 3 by the spring-loaded brake device 9, for example in the event of an unswitched multi-port control valve device 10 in the neutral position 10a, the control valve 55 and the freewheeling valve 65 are not actuated, so that the control valve 55 is in the first control position 55a and the freewheeling valve 65 is in a control position 65a. As a result of the discharge of the brake release pressure line 36 and of the control line 50 to the reservoir 13 in the first control position 55a of the control valve 55, the spring-loaded brake device 9 is impinged by the spring device 35 into the braking position and the bypass valve device 45 is impinged by the spring device 47 into the flow position 45b. The bypass valve device 45 in the flow position 45b thereby ensures that the drive motor 2 and the rope drum 3 are braked only by the mechanical braking torque of the spring-loaded brake device 9.

For the release of the spring-loaded brake device 9 of the rope drum 3, for example if the multi-port control valve device 10 is switched by the electronic control device 30 into the control position 10b, 10c to drive the driver motor 2, the electronic control device 30 switches the electrical actuator device 61 so that the control valve 55 is actuated into the second control position 55b, in which the brake release pressure line 36 and the control line 50 are connected with the delivery line 59 of the feed pump 58, so that the spring-loaded brake device 9 is impinged into the release position by the delivery pressure supplied by the feed pump 58 against the force of the spring device 35 and the bypass valve device 45 is impinged into the closed position 45a by the delivery pressure supplied by the feed pump 58 against the force of the spring device 47. The switching of the multi-port control valve device 10 and of the control valve 55 are preferably controlled so that the spring-loaded brake device 9 is actuated into the release position and the bypass valve device 45 into the closed position 45a before the multi-port control valve device 10, in the control position 10b or 10c, connects the delivery line 11 with the pressure medium line 15, 16 respectively.

If, when the spring-loaded brake device 9 is in the release position and the multi-port control valve device 10 is in the closed position 45a, the rope 4 is to be unspooled from the rope drum 3, via the electronic control device 30, by a switching of the additional electrical actuator device 67, switches the freewheeling device 65 into the second control position 65b, in which the section of the control line 50 connected with the bypass valve device 45 is relieved to the reservoir 13 and thus the bypass valve device 45 is actuated by the spring device 47 into the flow position 45b. When the spring brake device 9 is in the release position and the bypass valve device 45 is in the flow position 45b, the rope drum 3 can therefore be rotated with a tensile force applied to the rope 4 and the rope 4 can be unspooled from the rope drum 3. On a work machine equipped with the forestry winch 1 this makes it possible, for example, to fasten the rope 4 to a tree and with an unswitched multi-port control valve device 10, to unspool the rope 4 from the rope drum 3 when the work machine is moving, by hydraulically short circuiting the drive motor 2 in the flow position 45b of the bypass valve device 45.

The spring-biased shutoff valve 41 makes it possible to drive the drive motor 2 of the rope drum 3 in the second control position 10c of the multi-port control valve device 10 in the unspooling direction with a pressure limited by the bias of the spring of the spring-biased shutoff valve 41.

With the control valve 55, therefore, to release the spring-loaded brake device 9 in the second control position 55b with a signal (delivery pressure of the feed pump 58) to the first connection, at which the control line 50 and the brake release pressure line 36 are connected, the spring-loaded braking device 9 is actuated into the release position and the bypass valve device 45 is actuated into the closed position 45a. For a high level of functional and operational safety, the disclosure provides that when the control valve 55 is actuated into the second control position 55b, first the bypass valve device 45 is actuated into the closed position 45a and then the spring-loaded brake 9 is impinged into the release position.

In FIG. 2, the spring device 35 of the spring-loaded brake device 9 and the spring device 47 of the bypass valve device 45 are designed for this sequential actuation of the bypass valve device 45 into the closed position 45a before the spring-loaded brake device 9 is impinged into the release position. Preferably the bias of the spring device 47 of the bypass valve device 45 is selected so that it is less than the bias of the spring device 35 of the spring-loaded brake device 9, for example the bias of the spring device 47 of the bypass valve device 45 is set to approximately 2 bar and the bias of the spring device 35 of the spring-loaded brake device 9 is set to approximately 10 bar, so that when the brake release pressure line 36 and the control line 50 are connected with the delivery line 59 in the second control position 55b of the control valve 55, the bypass valve 45 is actuated into the closed position 45a before the spring-loaded brake device 9 is actuated against the bias of the spring device 35 into the release position.

Figure 3:
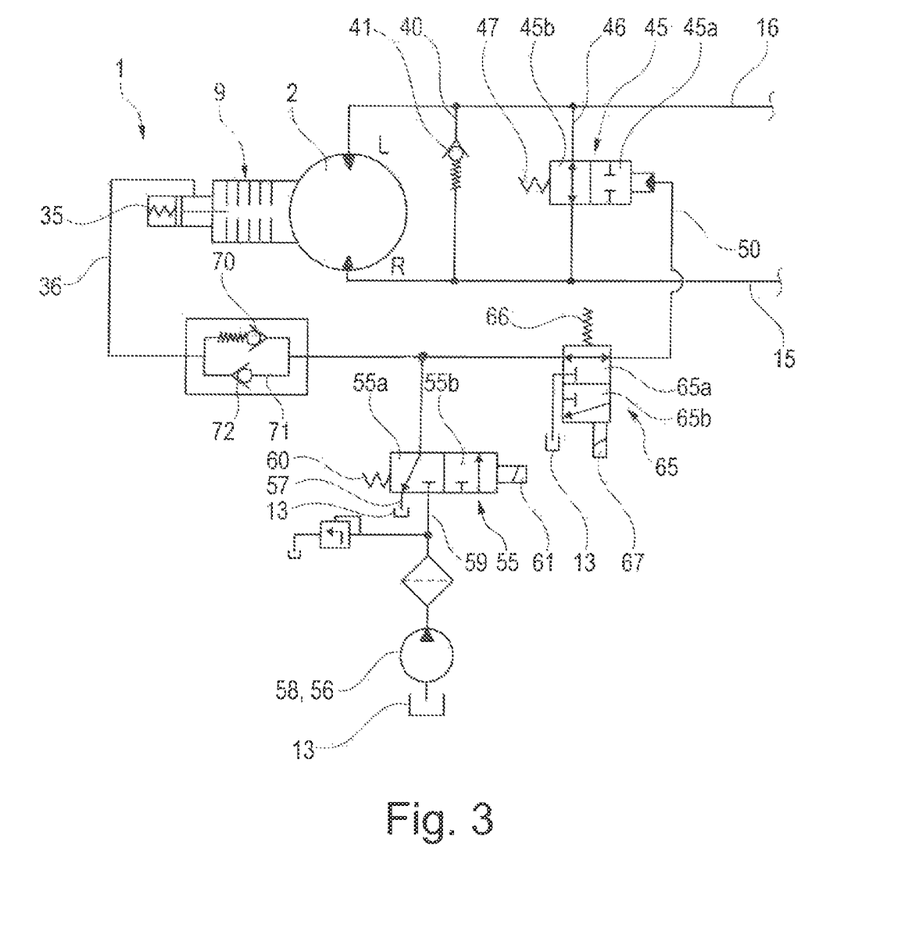
FIG. 3 is a second exemplary embodiment of a hydraulic circuit diagram of a forestry winch according to the disclosure.

FIG. 3 shows a variant of FIG. 2 in which the sequential actuation of the bypass valve device 45 into the closed position 45a alternatively occurs before the impingement of the spring-loaded brake device 9 into the release position.

In FIG. 3, for this purpose, in the brake release pressure line 35 there is an additional spring-biased shutoff valve 70, for example a check valve, that opens toward the spring-loaded brake device 9. The bias of the additional spring-biased shutoff valve 70 is selected so that in the second control position 55b of the control valve 55, it is guaranteed that first the bypass valve device 45 is actuated into the closed position 45a before the spring-loaded brake 9 is actuated into the release position.

In a bypass line 71 that bypasses the additional spring-biased shutoff valve 70, there is an unbiased shutoff valve 72, for example a check valve, that opens toward the control valve 55. The unbiased shutoff valve 72 makes it possible, in the first control position 55a of the control valve 55, for the brake release pressure present in the brake release pressure line 36 to be relieved more quickly to the reservoir 13 via the opening of the unbiased shutoff valve 72.

Figure 4:
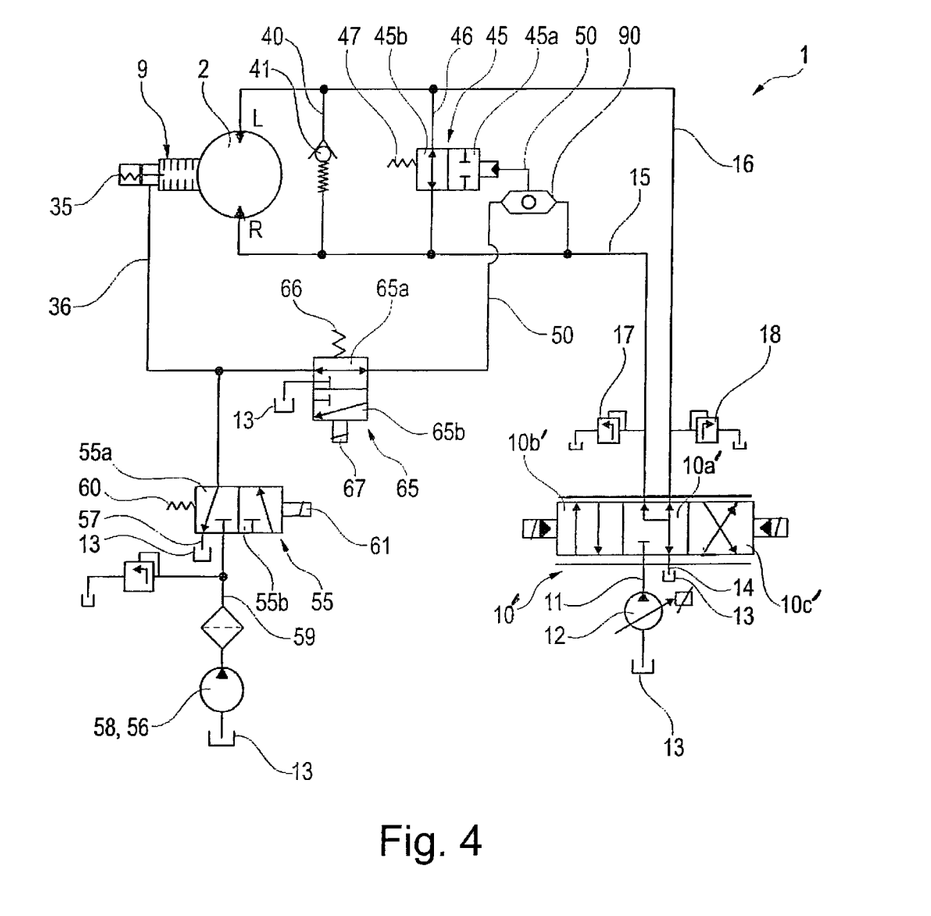
FIG. 4 is a schematic drawing of a hydraulic circuit diagram including features of the hydraulic circuit of FIGS. 2 and 3.

FIG. 4 shows a variant of FIGS. 2 and 3 in which the bypass valve device 45 can also be actuated into the closed position 45a by the pressure present in the first pressure medium line 15.

For this purpose, the control line 50 is connected by means of a shuttle valve 90 with the control pressure source 56 and the first pressure medium line 15. For this purpose, the shuttle valve 90 is connected at an output with the section of the control line 50 that leads to the bypass valve 45, at a first input with the section of the control line 50 connected via the freewheeling valve 65 and the control valve 55 with the control pressure source 56 and at an additional input with the first pressure medium line 15.

If a corresponding pressure is present in the first pressure medium line 15, for example if the multi-port control valve device 10 is actuated into the first control position 10b, the bypass valve device 45 is actuated by the pressure present in the first pressure medium line 15 into the closed position 45a and held there. A secure closing of the bypass valve device 45 can thereby be achieved.

In FIG. 4, in the neutral position 10a' of the multi-port control valve 10', the pressure medium lines 15, 16 are relieved into the reservoir 13. It thereby becomes possible to relieve the first pressure medium line 15 in the neutral position 10a' of the multi-port control valve device 10' so that the bypass valve device 45 can be actuated by the spring device 47 into the flow position 45b.

Figure 5:
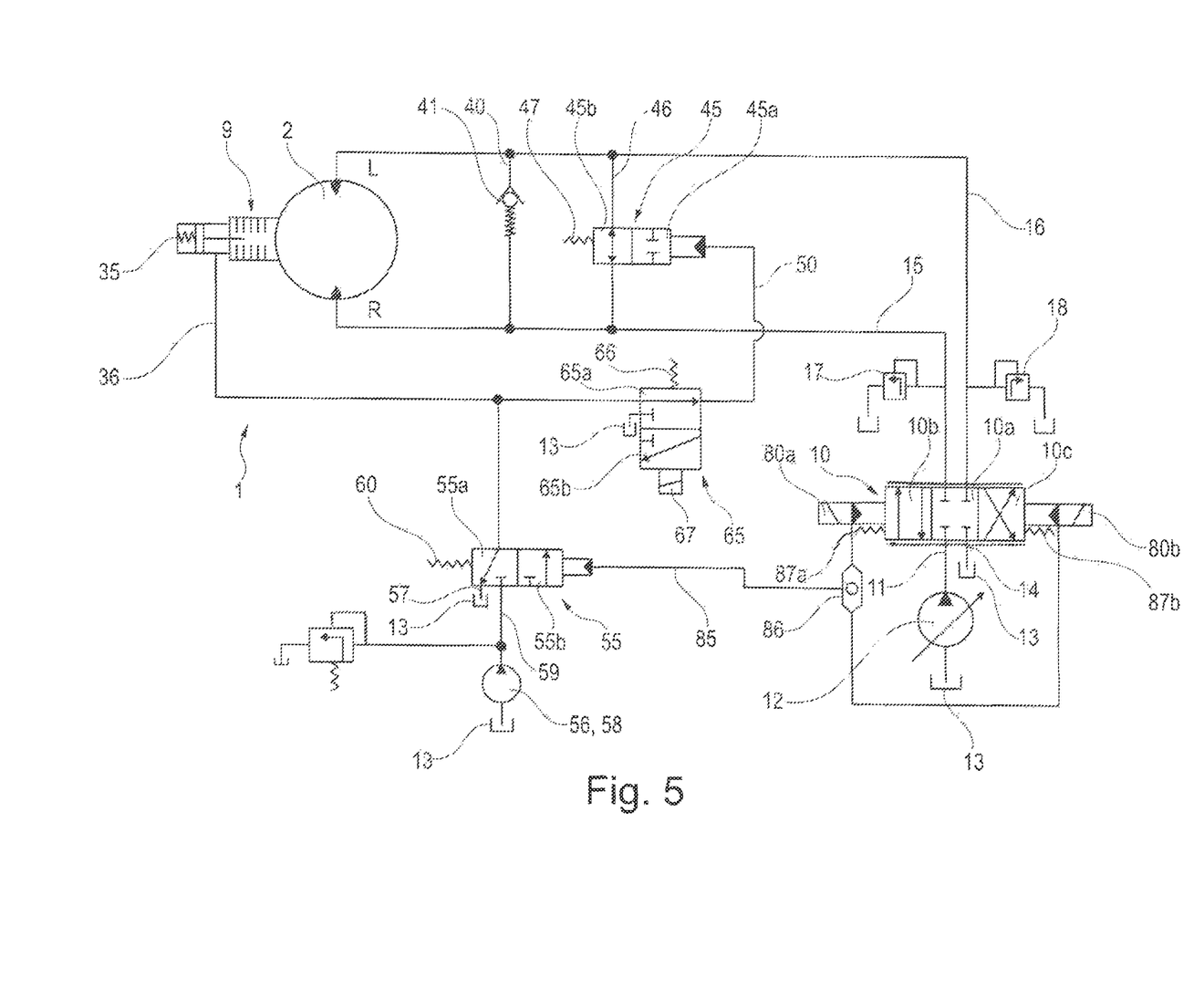
FIG. 5 is a schematic drawing of a hydraulic circuit diagram including features of the hydraulic circuit of FIGS. 2 to 4.

In FIGS. 2 to 4, the control valve 55 is actuated electrically by the electrical actuator device 61. FIG. 5 shows a variant of FIGS. 2 to 4 in which the control valve 55 can be actuated without the additional electrical actuator device 61 into the second control position 55b.

In FIG. 5, the multi-port control valve device 10 is switched electro-hydraulically, whereby hydraulic control pressures are generated by electrically controlled pilot valves 80a, 80b that actuate the multi-port control valve device 10 into the control positions 10b, 10c respectively. The control valve 55 in FIG. 4 can be actuated by the spring 60 toward the first control position 55a and by the hydraulic control pressures of the multi-port control valve device 10' toward the second control position 55b. For this purpose, a corresponding control surface of the control valve 55 is connected to a control pressure line 85 which via a shuttle valve 86 selects the corresponding control pressure of the multi-port control valve device 10' for the actuation of the control valve 55. The multi-port control valve device 10' is further biased and centered in the neutral position 10a by springs 87a, 87b. In FIG. 5, the biases of the springs 87a, 87b are selected higher than the bias of the spring 60 of the control valve 55. If one of the electrically controlled pilot valves 80a, 80b is switched, the result is that the hydraulic control pressure generated by the electrically controlled pilot valve 80a, 80b actuates the control valve 55 into the second control position 55b before the multi-port control valve device 10 is moved into the control position 10b, 10c, so that the spring-loaded brake device 9 is actuated into the release position and the bypass valve device 45 into the closed position 45a before the multi-port control valve device 10, in the control position 10b, 10c, connects the delivery line 11 with the pressure medium line 15, 16 respectively.

Figure 6:
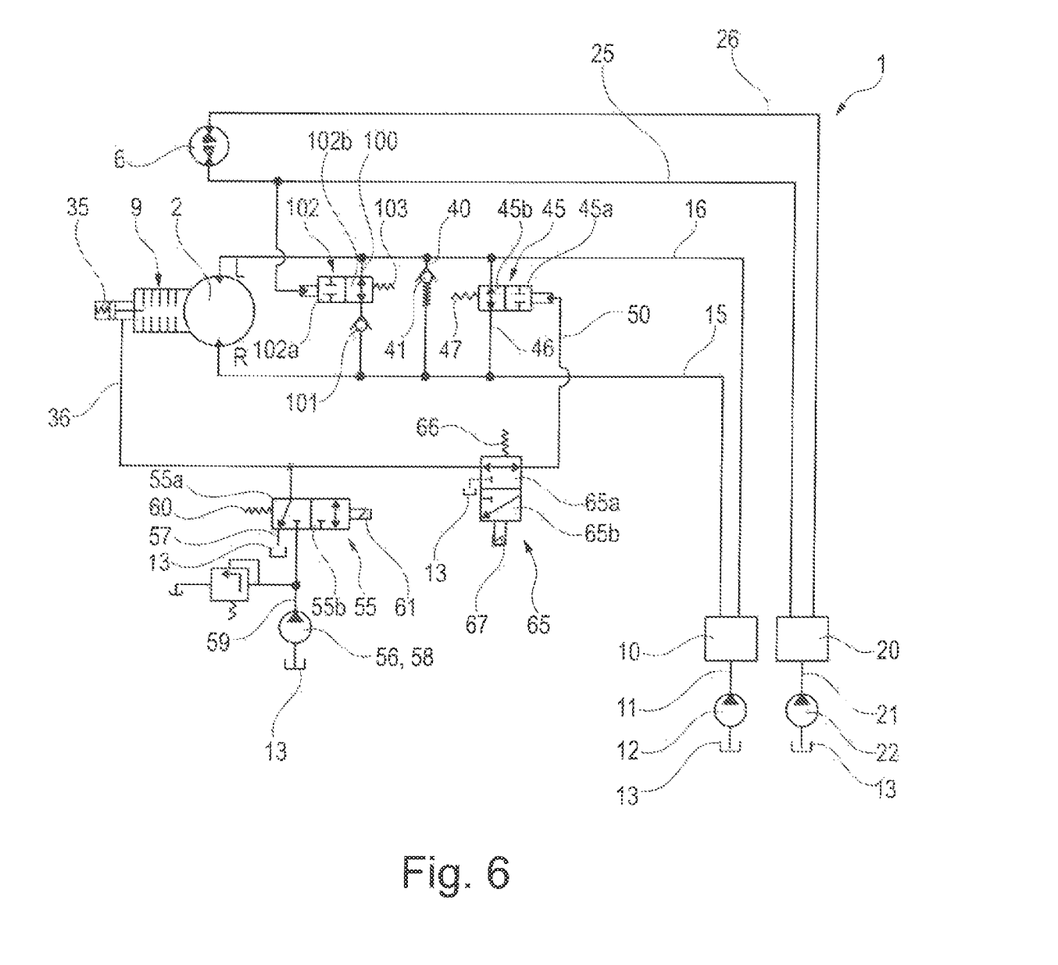
FIG. 6 is a schematic drawing of a hydraulic circuit diagram including features of the hydraulic circuit of FIGS. 2 to 5.

FIG. 6 shows a variant of FIGS. 2 to 5 in which, in a connecting line 100 connecting the first pressure medium line 15 with the second pressure medium line 16, there is an additional unbiased shutoff valve 101, for example a check valve, that opens toward the first pressure medium line 15.

In the connecting line 100 there is also a valve 102 controlled by the pressure in the first connecting line 25, which valve 102 has a closed position 102a and a flow position 102b. The valve 102 is actuated by a spring 103 toward the flow position 102b and by the pressure in the first connecting line 25 toward the closed position 102a.

In FIG. 6, therefore, two shutoff valves 41, 101 are provided which connect the second pressure medium line 16 with the first pressure medium line 15, whereby the spring-biased shutoff valve 41 generates a higher back pressure from the second pressure medium line 16 to the first pressure medium line 15 than the additional unbiased shutoff valve 101. With the valve 102 controlled by the pressure and thus the load of the additional drive motor 6 of the pusher roller 7, the back pressure from the second pressure medium line 16 to the first pressure medium line 15 can be switched between the low pressure of the additional unbiased shutoff valve 101 to the elevated pressure of the spring-biased shutoff valve 41.

FIG. 6 makes it possible to assist the unspooling of the rope 4 from the rope drum 3 by the additional drive motor 6 of the pusher roller 7 with the drive motor 2, as a function of the load of the additional drive motor 6.

To unspool the rope 4 from the rope drum 3, the multi-port control valve device 10 is actuated toward the second control position 10c and the additional multi-port control valve device 20 toward the first control position 20b.

In the first control position 20b, the additional drive motor 6 of the pusher roller 7 is driven in the unspooling direction by the inflowing volume flow in the first connecting line 25 which is connected with the delivery line 21 of the additional hydraulic pump 22. If, to drive the additional drive motor 6 of the pusher roller 7, a pressure in the first connecting line 25 suffices that is lower than the bias of the spring 103 of the valve 102, which is 100 bar, for example, the valve 102 is impinged by the spring 103 into the flow position 102b. The incoming volume flow in the second pressure medium line 16, which in the control position 10c of the multi-port control valve device 10 is connected with the delivery line 11 of the hydraulic pump 12, can therefore be discharged via the opening additional unbiased shutoff valve 101 when there is a low back pressure into the first pressure medium line 15, which in the control position 10c of the multi-port control valve device 10 is connected with the reservoir 13, so that the drive motor 2 of the rope drum 3 can rotate freely and the rope 4 is unspooled from the rope drum 3 by means of the pusher roller 7 driven by the drive motor 6. If the load on the drive motor 6 of the pusher roller 7 increases and the drive motor 6 of the pusher roller 7, for its drive, requires a pressure in the first connecting line 25 that is higher than the bias of the spring 103 of the valve 102, the valve 102 is impinged by the pressure present in the first connecting line 25 into the closed position 102a. From the additional unbiased shutoff valve 101, there is a switch to the spring-biased shutoff valve 41 set to a higher back pressure, as a result of which the drive motor 2 of the rope drum 3 is driven in the unspooling direction with the back pressure set on the spring-biased shutoff valve 41. The rope drum 3 driven by the drive motor 2 therefore assists the additional drive motor 6 of the pusher roller 7 during the unspooling of the rope 4 from the rope drum 3.

In FIGS. 2 to 6, the bypass valve device 45 is in the form of a bypass valve controlled directly by the control valve 55.

Figure 7:
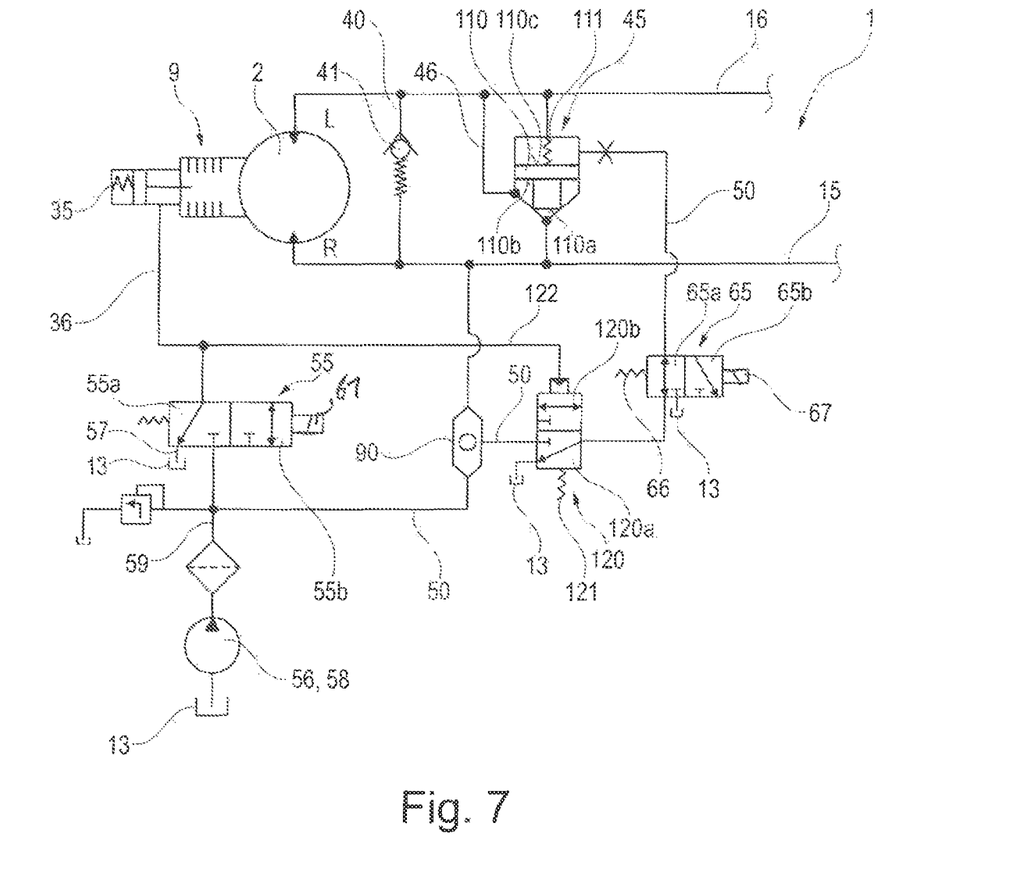
FIG. 7 is a third exemplary embodiment of a hydraulic circuit diagram of a forestry winch according to the disclosure.

FIG. 7 shows a variant of FIGS. 2 to 6 with a bypass valve device 45 which is in the form of a piloted bypass valve device 45. The bypass valve device 45 in FIG. 7 is in the form of a seat valve. The seat valve has a shutoff plunger 110 which controls a valve seat in the connecting line 46.

The shutoff plunger 110 has a first control surface 110a which acts toward a flow position and is impinged by the pressure present in the first pressure medium line 15, a second control surface 110b which acts toward a flow position and is impinged by the pressure in the second pressure medium line 16, and a third control surface 110c which acts toward a closed position and is impinged by the pressure present in the control line 50 and the pressure present in the second pressure medium line 16. The shutoff plunger 110 is also impinged toward the closed position by a spring 111.

The bypass valve 45 is piloted by the control valve 55, whereby the control valve 55 actuates a pilot valve 120 which in the first control position 120a connects the section of the control line 50 connected with the bypass valve 45 to the reservoir 13, and in the second control position 120b connects the control line 50 with the control pressure source 56.

The pilot valve 120 is actuated toward the first control position 120a by a spring 121 and toward the second control position 120b by a pilot pressure present in a pilot line 122. The pilot line 122, together with the brake release pressure line 36, is connected to the first port of the control valve 55, which is a three-port, two-position valve.

The construction of the control valve 55 in FIG. 7 is the same as the construction of the control valve 55 in FIGS. 2 to 6, so that the control valve 55, in a first control position 55a, connects the brake release pressure line 36 and the pilot line 122 that leads to the pilot valve 120 with the reservoir 13, and in a second control position 55b connects the brake release pressure line 36 and the pilot line 122 with the control pressure source 56.

In the exemplary embodiment illustrated in FIG. 7, analogous to the exemplary embodiment illustrated in FIG. 4, the bypass valve 45 can also be actuated into the closed position 45a by the pressure present in the first pressure medium line 15.

For this purpose, the control line 50 is connected by means of the shuttle valve 90 with the control pressure source 56 and the first pressure medium line 15. For this purpose, the shuttle valve 90 is connected at an output with the section of the control line 50 that leads to the pilot valve 120, at a first input with the section of the control line 50 connected with the control pressure source 56, and at an additional input with the first pressure medium line 15. In the exemplary embodiment illustrated in FIG. 7 the control line 50 is connected to the delivery line 59 of the control pressure pump 58 leading to the control valve 55.

Located in the section of the control line leading from the pilot valve 120 to the bypass valve device 45 is the freewheeling valve 65, the construction of which corresponds to that of the freewheeling valve 65 illustrated in FIGS. 2 to 6.

To brake the rope drum 3 by the spring-loaded brake device 9, for example when the multi-port control valve device 10 is not actuated and in the neutral position 10a, the control valve 55 and the freewheeling valve 65 are not actuated, so that the control valve 55 is in the first control position 55a and the freewheeling valve 65 is in the control position 65a. As a result of the relief of the brake release pressure line 36 and of the pilot line 122 to the reservoir 13 in the first control position 55a of the control valve 55, the spring-loaded brake device 9 is impinged by the spring device 35 into the braking position and the pilot valve 120 is impinged by the spring 121 into the first control position 120a, so that the section of the control line 50 connected with control surface 110c of the bypass valve 45 is relieved to the reservoir 13 and the bypass valve 45 is actuated by a slight pressure on one of the control surfaces 110a, 110b into the flow position 45b. The bypass valve device 45, which is in the flow position 45b, hereby ensures that the drive motor 2 or the rope drum 3 is braked only by the mechanical braking torque of the spring-loaded brake device 9.

For the release of the spring-loaded brake device 9 of the rope drum 3, in FIG. 7 the control valve 55 is actuated into the second control position 55b, in which the brake release pressure line 36 and the pilot line 122 are connected with the delivery line 59 of the feed pump 58, so that the spring-loaded brake 9 is actuated by the delivery pressure provided by the feed pump 58 against the force of the spring device 35 into the release position and the pilot valve 120 is actuated by the pilot pressure present in the pilot line 122 into the second control position 120b, in which, controlled by the shuttle valve 90, either the delivery pressure of the feed pump 58 or the high pressure of the first pressure medium line 15 is present at the control surface 110c of the shutoff plunger 110, as a result of which the bypass valve device 45 is impinged into the closed position.

To ensure a high level of functional and operational safety, whereby with the control valve 55 actuated into the second control position 55b, first the bypass valve device 45 is actuated into the closed position 45a and then the spring-loaded brake device 9 is impinged into the release position, in FIG. 7, analogous to FIG. 2, the spring biases can be selected accordingly, or analogous to FIG. 3, the shutoff valve combination consisting of the two shutoff valves 70, 72 can be inserted in the brake release pressure line 36.

The exemplary embodiment illustrated in FIG. 7 is suitable in particular for a bypass valve device 45 with a large nominal diameter, and with a bypass valve of this type makes possible a secure impinging into the closed position 45a to separate the two pressure medium lines 15, 16 when the spring-loaded brake device 9 is released.

The disclosure is not limited to the exemplary embodiments illustrated in the accompanying figures.

In FIGS. 1 to 5 and 7, the line 40 with the shutoff valve 41 can also be omitted.

The embodiments illustrated in FIGS. 2 and 3 can each be combined with the shuttle valve 90 from FIG. 4 and/or the hydraulic actuation of the control valve 55 illustrated in FIG. 5 and/or the additional unbiased shutoff valve 101 shown in FIG. 6.

It further goes that in FIG. 7, a hydraulic actuation of the control valve 55, analogous to FIG. 5, can be employed, and/or an additional unbiased shutoff valve 101 as in FIG. 6.

It will be readily appreciated by those skilled in the art that modifications may be made to the disclosure without departing from the concepts disclosed in the foregoing description. Accordingly, the particular embodiments described in detail herein are illustrative only and are not limiting to the scope of the disclosure, which is to be given the full breadth of the appended claims and any and all equivalents thereof.

The invention claimed is:

1. A forestry winch comprising:
   a rope drum driven by a drive motor, wherein a rope is spooled on the rope drum, wherein the rope drum is functionally connected with a brake device, wherein the brake device is in the form of a spring-loaded brake which is impinged by a spring device toward a braking position and by a hydraulic brake release pressure present in a brake release pressure line toward a release position, wherein the drive motor is in the form of a hydraulic motor which is connected by a first pressure medium line and a second pressure medium line to a multi-port control valve device controlling the drive motor, and
   a bypass valve device connecting the first and second pressure medium lines, wherein the bypass valve device is located in a connecting line connecting the first and second pressure medium lines and has a closed position and a flow position, wherein the bypass valve device is actuated by a hydraulic control pressure present in a control line toward the closed position, wherein the spring-loaded brake and the bypass valve device are controlled jointly by a control valve,
   wherein:
   the bypass valve device is in the form of a bypass valve controlled directly by the control valve, wherein the control valve, in the first control position, connects the brake release pressure line and the control line with a reservoir, and in the second control position connects the brake release pressure line and the control line with a control pressure source, or
   the bypass valve device is a bypass valve controlled by the control valve, wherein the control valve actuates a pilot valve which in a first control position connects the control line with a reservoir and in a second control position connects the control line with a control pressure source, wherein the control valve, in the first control position, connects the brake release pressure line and a pilot line leading to the pilot valve with the reservoir, and in the second control position, connects the brake release pressure line and the pilot line with a control pressure source.

2. The forestry winch according to claim 1, wherein, in a first control position of the control valve, the spring-loaded brake is impinged into the braking position and the bypass valve device into the flow position, and in a second control position of the control valve, the spring-loaded brake is impinged into the release position and the bypass valve device into the closed position.

3. The forestry winch according to claim 2, wherein the bypass valve device is actuated toward the closed position by the control pressure present in the control line.

4. The forestry winch according to claim 2, wherein the control valve is configured to be actuated toward the first control position by a spring and toward the second control position by an electrical actuator device.

5. The forestry winch according to claim 2, wherein the multi-port control valve device is actuated by hydraulic control pressures, wherein the control valve is configured to be actuated toward the first control position by a spring and toward the second control position by the hydraulic control pressures of the multi-port control valve device.

6. The forestry winch according to claim 2, wherein, with the control valve actuated into the second control position, the bypass valve device is configured to be first actuated into the closed position and then the spring-loaded brake is configured to be impinged into the release position.

7. The forestry winch according to claim 6, wherein the spring device of the spring-loaded brake and at least one of a spring device of the bypass valve device or a spring device of a pilot valve are configured so that when the control valve is actuated into the second control position, the bypass valve device is configured to be first actuated into the closed position and then the spring-loaded brake is configured to be impinged into the release position.

8. The forestry winch according to claim 6, wherein a spring-biased shutoff valve is located in the brake release pressure line that opens toward the spring-loaded brake.

9. The forestry winch according to claim 8, wherein an unbiased shutoff valve is located in a bypass line that bypasses the spring-biased shutoff valve that opens toward the control valve.

10. The forestry winch according to claim 1, wherein the pilot valve is actuated by a spring toward the first control position and by a pilot pressure present in the pilot line toward the second control position.

11. The forestry winch according to claim 1, wherein a freewheeling valve is located in the control line, which in a first control position, the freewheeling valve opens the control line and in a second control position, the freewheeling valve relieves a section of the control line connected with the bypass valve device to a reservoir.

12. The forestry winch according to claim 11, wherein the freewheeling valve is configured to be actuated by a spring toward the first control position and is configured to be actuated toward the second control position by an electrical actuator device.

13. The forestry winch according to claim 1, a spring-biased shutoff valve is provided in a line connecting the first pressure medium line with the second pressure medium line that opens toward the first pressure medium line.

14. The forestry winch according to claim 1, further comprising a pusher roller driven by an additional drive motor for the rope, wherein the additional drive motor is in the form of a hydraulic motor which is connected by a first connecting line and a second connecting line to a multi-port control valve device that controls the additional drive motor.

15. The forestry winch according to claim 14, wherein an unbiased shutoff valve is located in a connecting line connecting the first pressure medium line with the second pressure medium line that opens toward the first pressure medium line, wherein in the connecting line there is a valve controlled by the pressure in the first connecting line that has a closed position and a flow position.

16. The forestry winch according to claim 15, wherein the valve is actuated by a spring toward the flow position and by the pressure in the first connecting line toward the closed position.

17. A mobile work machine comprising the forestry winch according to claim 1.

* * * * *